US008876476B2

(12) United States Patent
Blewett et al.

(10) Patent No.: US 8,876,476 B2
(45) Date of Patent: Nov. 4, 2014

(54) INTEGRATED ACCESSORY GEARBOX AND ENGINE STARTER

(75) Inventors: Michael R. Blewett, Stillman, IL (US); Keith E. Short, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 916 days.

(21) Appl. No.: 12/946,999

(22) Filed: Nov. 16, 2010

(65) Prior Publication Data

US 2012/0118103 A1    May 17, 2012

(51) Int. Cl.
*F02C 7/277* (2006.01)
*F02C 7/32* (2006.01)
*F02N 9/04* (2006.01)
*F02N 15/00* (2006.01)

(52) U.S. Cl.
CPC ... *F02N 9/04* (2013.01); *F02C 7/32* (2013.01); *F02N 15/006* (2013.01); *F02C 7/277* (2013.01); *Y02T 50/671* (2013.01)
USPC ...................................................... 416/170 R

(58) Field of Classification Search
USPC ...... 416/120, 169 R, 170 R, 171, 175, 198 A; 415/62, 66, 123
See application file for complete search history.

(56) References Cited

U.S. PATENT DOCUMENTS

| 2,909,166 | A | | 10/1959 | Cluff et al. | |
|---|---|---|---|---|---|
| 4,543,074 | A | | 9/1985 | Ville et al. | |
| 4,546,605 | A | | 10/1985 | Mortimer et al. | |
| 4,871,296 | A | * | 10/1989 | Laessle et al. | 415/123 |
| 4,926,631 | A | | 5/1990 | Sorenson | |
| 5,042,963 | A | * | 8/1991 | Sorenson et al. | 415/18 |
| 5,205,386 | A | | 4/1993 | Goodman et al. | |
| 5,237,815 | A | * | 8/1993 | McArthur | 60/787 |
| 5,246,094 | A | | 9/1993 | Army et al. | |
| 5,257,685 | A | | 11/1993 | Tichiaz et al. | |
| 5,267,433 | A | | 12/1993 | Burch | |
| 5,363,641 | A | | 11/1994 | Dixon et al. | |
| 5,419,420 | A | * | 5/1995 | Quenneville | 192/103 A |
| 5,553,449 | A | | 9/1996 | Rodgers et al. | |
| 6,050,080 | A | | 4/2000 | Homer | |
| 6,305,156 | B1 | | 10/2001 | Lui | |
| 6,537,027 | B2 | | 3/2003 | Telakowski | |

(Continued)

FOREIGN PATENT DOCUMENTS

| SU | 558118 A1 | 5/1977 |
|---|---|---|
| WO | 2006059992 | 6/2006 |

OTHER PUBLICATIONS

The European Search Report dated Jul. 11, 2012 for European Application No. 11250903.9.

(Continued)

*Primary Examiner* — Edward Look
*Assistant Examiner* — Eldon Brockman
(74) *Attorney, Agent, or Firm* — Kinney & Lange, P.A.

(57) ABSTRACT

An air turbine starter and accessory gearbox assembly, the accessory gearbox includes a gear shaft and the air turbine starter includes an output shaft and a clutch assembly. The output shaft extends from the accessory gearbox and is coupled to and supported by the gear shaft. The accessory gearbox is adapted to receive the air turbine starter such that the clutch assembly and the output shaft are disposed within a casing of the accessory gearbox when the air turbine starter is mounted to the accessory gearbox.

11 Claims, 4 Drawing Sheets

(56) References Cited

U.S. PATENT DOCUMENTS

| | | |
|---|---|---|
| 6,623,238 B2 | 9/2003 | Langston et al. |
| 6,681,579 B2 | 1/2004 | Lane et al. |
| 7,033,134 B2 * | 4/2006 | Bristol et al. ............ 415/110 |
| 7,159,614 B2 | 1/2007 | Tiziani et al. |
| 2003/0145602 A1 * | 8/2003 | Lane et al. .................. 60/787 |
| 2006/0102232 A1 * | 5/2006 | Plevich et al. ............ 137/488 |
| 2007/0215326 A1 | 9/2007 | Schwarz et al. |
| 2009/0007568 A1 | 1/2009 | Eccles et al. |
| 2010/0167863 A1 | 7/2010 | Lemmers, Jr. |
| 2012/0006137 A1 * | 1/2012 | Short et al. ................ 74/460 |

OTHER PUBLICATIONS

Agent JayZ: "The Air Starter—Turbine Engines: A Closer Look". Youtube www.youtube.com/watch?v=G28OIUqpUfE Jul. 23, 2011, Video from 0:00 to 1:30 and 3:50 to 5:30.

* cited by examiner

INTEGRATED ACCESSORY GEARBOX AND ENGINE STARTER

BACKGROUND

The present invention relates to gas turbine engines. In particular, the invention relates to the mounting of air turbine starters on accessory gearboxes.

Gas turbine engines require a significant torque be applied to rotate a compressor in the gas turbine, and thereby to provide sufficient compression to start the engine. Electric motors powerful enough to provide such torque can be used, but are relatively heavy. Where gas turbine engines are used for transportation purposes, for example, aircraft propulsion and power, such an extra weight penalty is undesirable. An air turbine starter (ATS) is generally employed as a substitute in such applications. The ATS is powered by compressed air from an external source. The compressed air passes over blades of an air turbine in the ATS and exits the ATS through an air exit port. As the air turbine rotates, it rotates a series of shafts connected to the compressor in the gas turbine engine, providing sufficient torque to start the engine.

For many gas turbine engines, the ATS is a stand alone line replaceable unit (LRU) that is mounted to the accessory gearbox. The ATS includes an overrunning clutch assembly that selectively couples the ATS's transmission to the output shaft. The overrunning clutch is supported by dedicated clutch bearings that are in turn supported by a separate transmission housing of the ATS. These features add size, weight, and cost to the ATS.

SUMMARY

An air turbine starter and accessory gearbox assembly and method of removing the air turbine starter from the accessory gearbox, the accessory gearbox includes a gear shaft and the air turbine starter includes an output shaft and a clutch assembly. The output shaft extends from the accessory gearbox and is coupled, supported, and axially retained by the gear shaft. The accessory gearbox is adapted to receive the air turbine starter such that the clutch assembly and the output shaft are disposed within a casing of the accessory gearbox when the air turbine starter is mounted to the accessory gearbox.

DETAILED DESCRIPTION

Figure 1A:
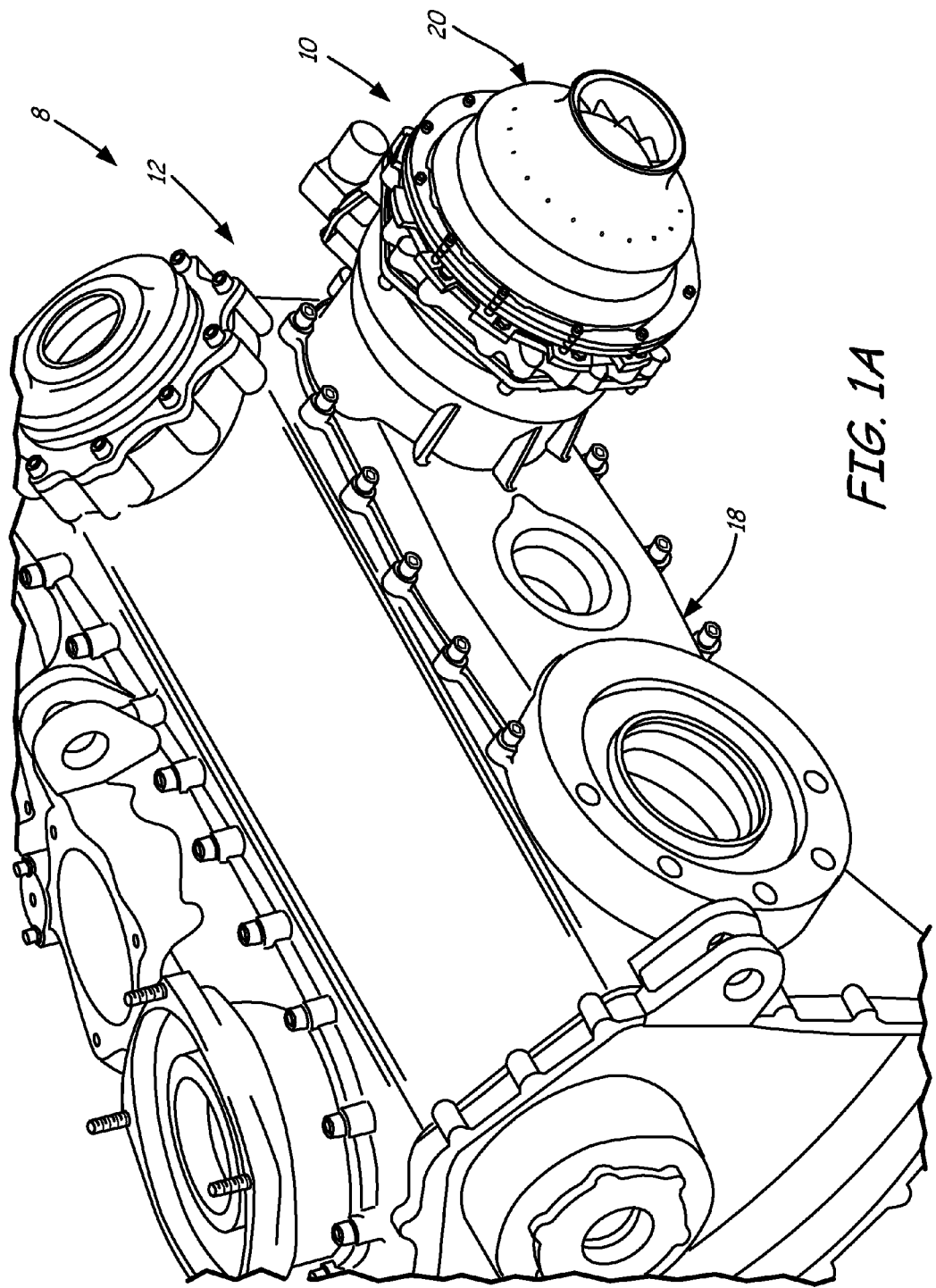
FIG. 1A is a perspective view of one embodiment of air turbine starter mounted to a casing of an accessory gearbox.
Figure 1B:
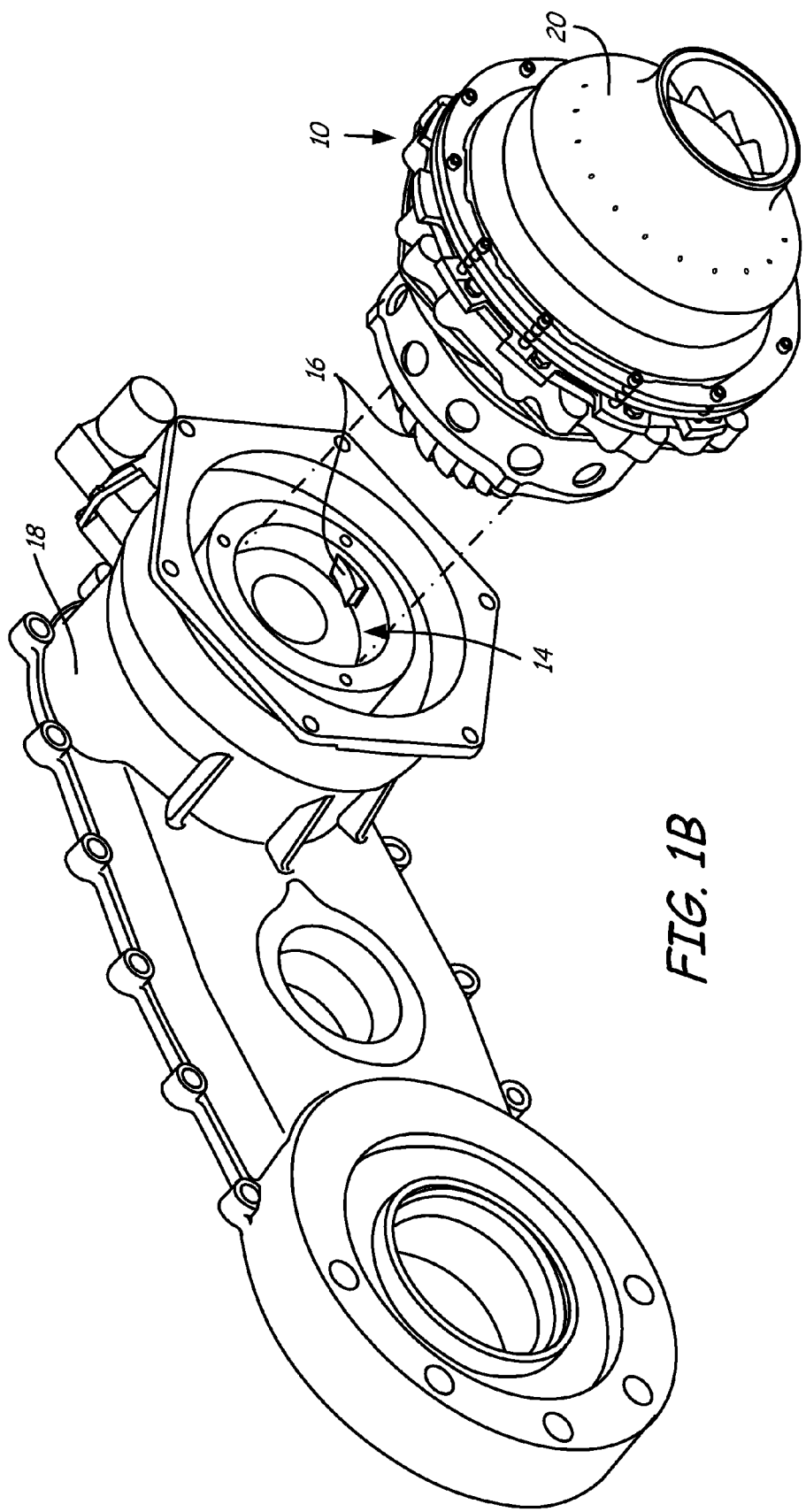
FIG. 1B is a perspective view of the air turbine starter removed from the accessory gearbox to show a clutch assembly.

FIG. 1A illustrates an embodiment of an air turbine starter 10 mounted to an accessory gearbox 12 as an assembly 8. FIG. 1B shows the air turbine starter 10 removed from the accessory gearbox housing 18 to illustrate an output shaft 14 and a portion of a clutch assembly 16 of the air turbine starter 10.

In one embodiment both the air turbine starter 10 and the accessory gearbox 12 comprise line replaceable units (LRUs) that are mounted on, within, or adjacent a gas turbine engine. In particular, FIGS. 1A and 1B illustrate a housing 18 of the accessory gearbox 12. The housing 18 is also referred to as a casing 18, as both terms are intended to be synonymous. Similarly, the air turbine starter 10 includes a turbine housing 20 that surrounds and supports internal components of the air turbine starter 10. The accessory gearbox 12 is adapted to receive the air turbine starter 10 such that the housing 18 surrounds a portion of the air turbine starter 10 when the air turbine starter 10 and accessory gearbox 12 are assembled together. In particular, as is illustrated in FIG. 1B, the output shaft 14 and a portion of the clutch assembly 16 are surrounded by the housing 18 of the accessory gearbox 12. As will be discussed subsequently, a gear shaft (not shown) of the accessory gearbox 12 supports the output shaft 14 of the air turbine starter 10 allowing it to be disposed within the housing 18 of the accessory gearbox 12. This support configuration, along with other structures detailed subsequently, allow for the elimination of a dedicated clutch bearing, the elimination of an additional an air turbine starter transmission housing, and a reduction in the overall number of housing split lines for the air turbine starter 10 and the accessory gearbox 12 assembly 8. These eliminations and reductions in parts reduce the size, weight, and cost of the assembly 8.

The air turbine starter 10 and accessory gearbox 12 operate in a conventional manner to apply torque to rotate a compressor in the gas turbine engine to provide sufficient compression to start the engine. The clutch assembly 16 shown in FIG. 1B is a conventional over-running clutch, such at those disclosed in U.S. Pat. Nos. 5,205,386, 5,246,094, and 5,257,685, which are incorporated herein by reference. The clutch assembly 16 acts to engage the transmission components of the air turbine starter 10 to the gas turbine engine for startup and disengage the transmission components from the gas turbine engine once the gas turbine engine achieves operational speeds.

Figure 2:
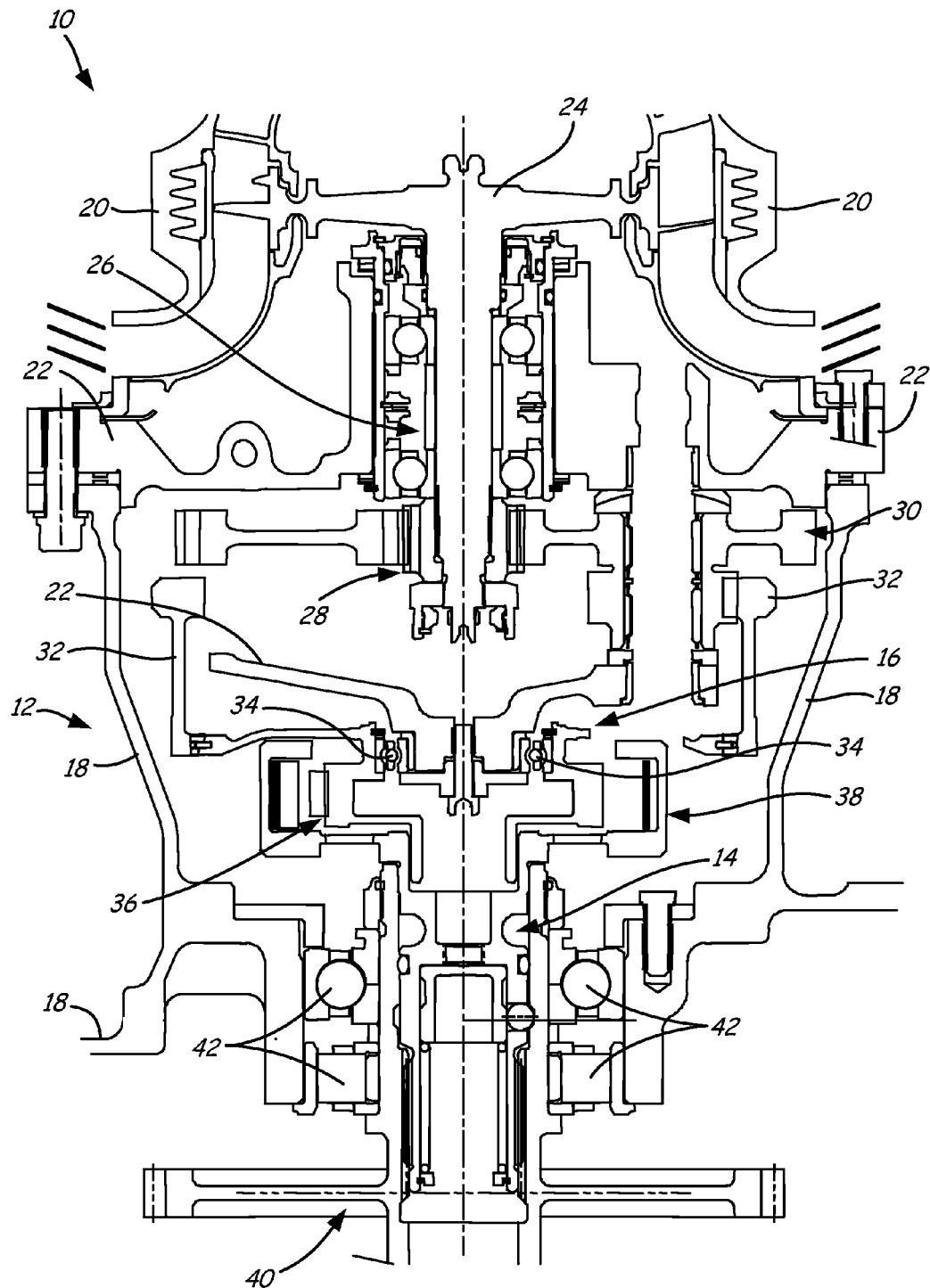
FIG. 2 is a sectional view of portions of the air turbine starter and the accessory gearbox from FIG. 1A.

FIG. 2 shows a sectional view of portions of the air turbine starter 10 and the accessory gearbox 12 assembled together. In addition to the output shaft 14, the clutch assembly 16, and the turbine housing 20, the air turbine starter 10 includes a carrier housing 22, a turbine 24, a turbine spindle assembly 26, a pinion 28, planet gears 30, ring gear 32, and the ring gear support bearing 34. The clutch assembly 16 includes an inner element 36 and an outer element 38. The accessory gearbox 12 includes a gear shaft 40 and gearbox shaft bearings 42.

As shown in FIG. 2, the turbine housing 20 is disposed around and connected to the carrier housing 22. The turbine housing 20 and the carrier housing 22 are disposed about the turbine 24 and together the housings 20 and 22 form a flow path for compressed air. The turbine 24 is rotatably connected to and extends through the turbine spindle assembly 26, which includes support bearings for the turbine 24, turbine wheel, and the pinion 28. The pinion 28 connects to the turbine 24 and meshes with the planet gears 30. Although only one planet gear 30 is illustrated FIG. 2, one or more planet gears 30 can be assembled to transfer torque from the turbine 24 to the ring gear 32. The ring gear 32 meshes with the planet gears 30 and connects to the inner element 36 of the clutch assembly 16. The ring gear support bearing 34 is disposed adjacent the clutch assembly 16 to support the ring gear 32 and the inner element 36. The inner element 36 of the clutch extends from the ring gear 32 and interfaces with the outer element 38. As is known in the art, the inner element 36 can include a plurality of ratchets that interact with pawls disposed on the outer element 38 to transfer torque from the inner element 36 to the outer element 38 during gas turbine engine startup.

The outer element 38 of the clutch assembly 16 connects to the output shaft 14 of the air turbine starter 10. The output shaft 14 extends into and is coupled to and supported by the gear shaft 40. In one embodiment, the output shaft 14 is connected in a close fit engagement with gear shaft 40. This connection allows the gear shaft 40 to support the output shaft 14 of the air turbine starter 10 without the use of additional bearings. The gearbox shaft bearings 42 are disposed radially outward of and between the gear shaft 40 and the housing 18.

The housing 18 of the accessory gearbox 12 encloses and contains rotating elements that transfer power to the gas turbine engine and accessories during engine startup. The turbine housing 20 and the carrier housing 22 are mounted to the housing 18 by fasteners and protect and support components internal thereto such as the turbine 24 and turbine spindle 26. The turbine 24 is rotated to provide startup torque for the gas turbine engine by compressed gas passing between the carrier housing 22 and turbine housing 20 and passing over the blades of the turbine 24. The turbine spindle 26 supports the turbine 24 and the pinion 28, allowing for a transfer of startup torque from the turbine 24 to the planet gears 30. The planet gears 30 transmit torque to the ring gear 32 and reduce the rotational speed from the rotational speed of the turbine 24 to the rotational speed of the output shaft 14. As is known in the art, the clutch assembly 16 restricts the direction of driving torque from the air turbine starter 10 to the output shaft 14 such that torque cannot be transmitted to the air turbine starter 10 from the gas turbine engine via the gear shaft 40 and output shaft 14. In fact, once the gas turbine engine has started and the gear shaft 40 and the output shaft 14 achieve operational speeds, the pawls disposed on the outer element 38 retract from contact with the ratchets on inner element 36 so that torque is not transferred to the ring gear 32, planet gears 30, and the turbine 24. The ring gear support bearing 34 and gearbox shaft bearings 42 support the ring gear 30 and gear shaft 40 respectively, and allow for rotation of the ring gear 30 and gear shaft 40 with respect to the housing 18 of the accessory gearbox 12.

Figure 3A:
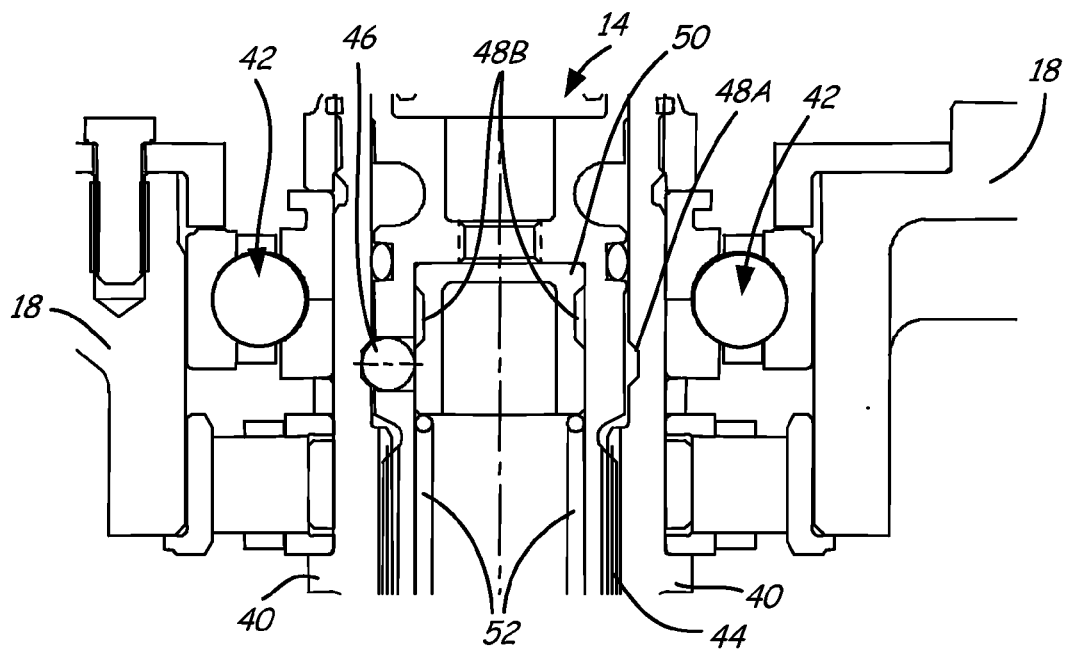
FIG. 3A is a sectional view of an output shaft of the air turbine starter coupled to a gear shaft of the accessory gearbox by a ball lock element.
Figure 3B:
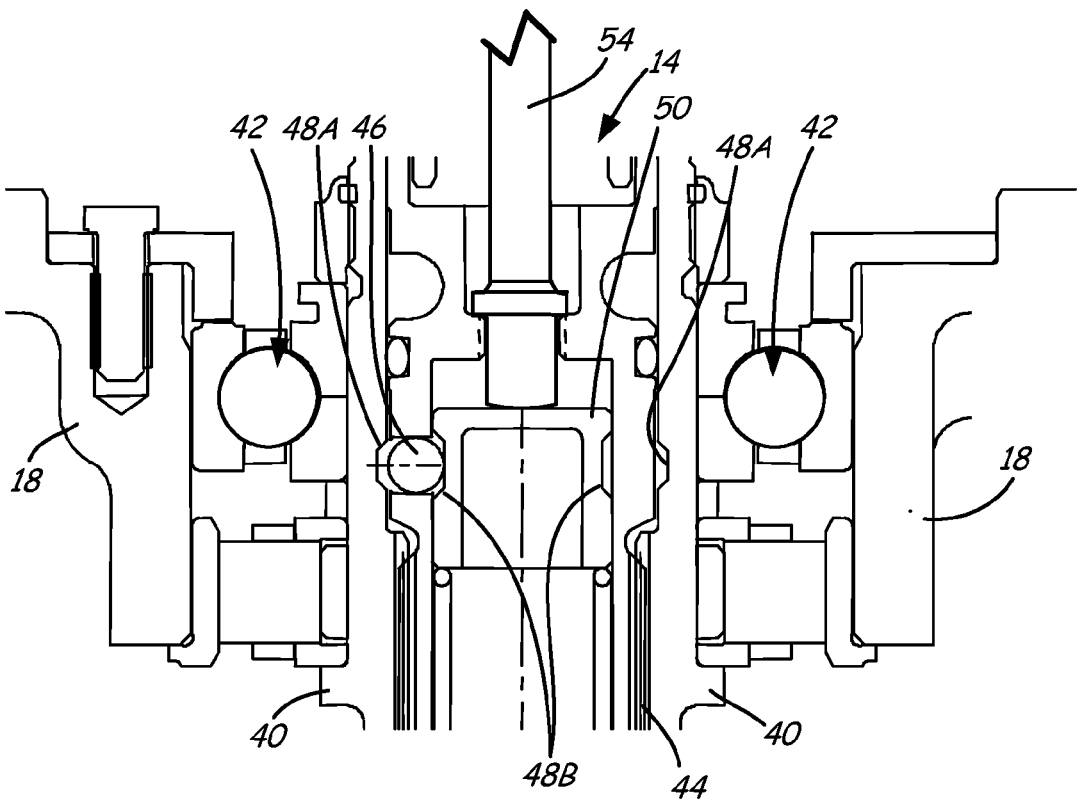
FIG. 3B is a sectional view of the output shaft of the air turbine starter decoupled from the gear shaft of the accessory gearbox by a tool.

FIGS. 3A and 3B show portions of the output shaft 14 and the gear shaft 40 from FIG. 2. In addition, to the output shaft 14, the casing 18, the gear shaft 40, and the gearbox shaft bearings 42, FIGS. 3A and 3B show splines 44, ball lock elements 46, detents 48A and 48B, a plunger 50, spring 52, and an assembly tool 54.

In FIG. 3A, the output shaft 14 is coupled to the gear shaft 40. In particular, a portion of the output shaft 14 is disposed within the gear shaft 40 such that it is in a close fit engagement therewith. This allows the output shaft 14 to by be solely supported by the gear shaft 40. The splines 44 on the gear shaft 40 and output shaft engage one another and transfer the start torque from the air turbine starter 10 to the gas turbine engine. In FIG. 3A, the ball lock elements 46 (typically three) are disposed between the output shaft 14 and the gear shaft 40 so as to engage the annular detent 48A on the gear shaft 40. The output shaft 14 includes the plunger 50 and the spring 52. The plunger 50 is movable relative to the remainder of the output shaft 14 and the spring 52 engages a lower portion of the plunger 50. The plunger 50 also includes an annular detent 48B. As illustrated in FIG. 3B, the assembly tool 54 can be used to move the plunger 50 relative to the remainder of the output shaft 14 and gear shaft 40 by depressing the spring 52.

The splines 44 allow for the transfer of torque from the output shaft 14 to the gear shaft 40. In FIG. 3A, axial motion of the output shaft 14 relative to the gear shaft 40 is arrested by the ball lock elements 46, which engages the detent 48A in the gear shaft 40 so as to axially couple the output shaft 14 to the gear shaft 40. In FIG. 3A, the plunger 50 is biased upward by the spring 52 to force the ball lock elements 46 into engagement with the detent 48A in the gear shaft 40.

To decouple the output shaft 14 from the gear shaft 40 for replacement or repair, the inner element 36 (FIG. 2) of the clutch assembly 16 (FIG. 2) is removed by retracting the pawls of the clutch assembly 16 from engagement with the ratchets of the inner element 36 (FIG. 2). This allows the air turbine starter 10 (FIG. 1A), save for the outer element 38 of the clutch assembly 16 and the output shaft 14 to be removed from the accessory gearbox 12 (FIG. 1B).

FIG. 3B shows the output shaft 14 in a decoupled position from the gear shaft 40. This position allows for axial removal of the output shaft 14 from the accessory gearbox 12 (FIG. 1B) for replacement or repair. In FIG. 3B, the ball lock elements 46 are no longer engaged by the plunger 50 and have ramped out of engagement with the detent 48A in the gear shaft 40. The ball lock elements 46 are now engaged with the detents 48B in the plunger 50. The plunger 50 is depressed into the position shown in FIG. 3B by the assembly tool 54, which overcomes the bias of the spring 52 to force the plunger 50 to move axially relative to the output shaft 14 and the gear shaft 40. In FIG. 3B, the output shaft 14 is free to move axially relative to gear shaft 40 and can be removed.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly comprising:
   an air turbine starter having an output shaft, and a gear assembly and clutch assembly connecting the output shaft to a turbine spindle;
   an accessory gearbox having a gear shaft that is coupled to and supports the output shaft of the air turbine starter, wherein the accessory gearbox is adapted to receive the air turbine starter such that a casing of the accessory gearbox extends around the output shaft and the clutch assembly of the air turbine starter when the air turbine starter is mounted on the accessory gearbox; and
   a ball lock element disposed between the gear shaft and the output shaft, wherein the gear shaft and the output shaft each include a detent feature capable of receiving a portion of the ball lock element.

2. The assembly of claim 1, wherein the gear shaft receives the output shaft in a close fit engagement.

3. The assembly of claim 1, wherein the output shaft has a plunger and spring, the spring biases the plunger which engages the ball lock element with the gear shaft.

4. The assembly of claim 3, further comprising a tool that depresses the plunger to overcome the bias of the spring and disengage the ball lock element from the gear shaft.

5. An assembly comprising:
   an air turbine starter having a clutch assembly and an output shaft coupled to the clutch assembly;
   an accessory gearbox adapted to receive the air turbine starter such that the clutch assembly and the output shaft are disposed within a casing of the accessory gearbox when the air turbine starter is mounted on the accessory gearbox, wherein the accessory gearbox has a gear shaft that supports the output shaft of the air turbine starter;

a ball lock element disposed between the gear shaft and the output shaft, wherein the gear shaft and the output shaft each include a detent feature capable of receiving a portion of the ball lock element, and wherein the output shaft has a plunger and spring, the spring biases the plunger which engages the ball lock element with the gear shaft; and a tool that depresses the plunger to overcome the bias of the spring and disengage the ball lock element from the gear shaft.

6. The assembly of claim 5, wherein the gear shaft receives the output shaft in a close fit engagement.

7. A method of removing an air turbine starter from an accessory gearbox, the method comprising:

providing an air turbine starter having an output shaft mounted in a gear shaft of the accessory gearbox;

retracting pawls of a clutch assembly of the air turbine starter from contact with corresponding clutch assembly ratchets to allow a portion of the air turbine assembly to be removed from the accessory gearbox;

depressing a plunger disposed within the gear shaft to overcome a bias of a spring and disengage a ball lock element from the gear shaft; and removing the output shaft by axially moving the output shaft relative to the gear shaft.

8. The method of claim 7, wherein:

the ball lock element is disposed between the gear shaft and the output shaft, and wherein the gear shaft and the plunger each include a detent feature capable of receiving a portion of the ball lock element.

9. The method of claim 7, wherein a tool depresses the plunger to overcome the bias of the spring and disengage the ball lock element from the gear shaft.

10. The method of claim 7, wherein the accessory gearbox is adapted to receive the air turbine starter such that a casing of the accessory gearbox extends around the output shaft of the air turbine starter when the air turbine starter is mounted on the accessory gearbox.

11. The method of claim 10, wherein the air turbine starter has a gear assembly and clutch assembly connecting the output shaft to a turbine spindle, and wherein the casing of the accessory gearbox extends around the clutch assembly of the air turbine starter when the air turbine starter is mounted on the accessory gearbox.

\* \* \* \* \*

UNITED STATES PATENT AND TRADEMARK OFFICE
CERTIFICATE OF CORRECTION

| | |
|---|---|
| PATENT NO. | : 8,876,476 B2 |
| APPLICATION NO. | : 12/946999 |
| DATED | : November 4, 2014 |
| INVENTOR(S) | : Michael R. Blewett et al. |

It is certified that error appears in the above-identified patent and that said Letters Patent is hereby corrected as shown below:

In The Specification

Col. 3, Line 52
  Delete "by"

Signed and Sealed this
Tenth Day of February, 2015

Michelle K. Lee
*Deputy Director of the United States Patent and Trademark Office*